(12) United States Patent
Swallow

(10) Patent No.: US 7,233,569 B1
(45) Date of Patent: Jun. 19, 2007

(54) TUNNEL REROUTE

(75) Inventor: George Swallow, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/315,196

(22) Filed: May 19, 1999

(51) Int. Cl.
*H04L 1/00* (2006.01)
*H04L 12/26* (2006.01)

(52) U.S. Cl. ............................. 370/225; 370/237

(58) Field of Classification Search ........ 370/216–220, 370/225–228, 229, 231, 235, 237, 254, 257, 370/351, 389, 392, 400, 409, 431, 437, 464, 370/465, 474, 901–902, 912; 709/223, 226, 709/229, 230, 355, 360
See application file for complete search history.

(56) References Cited

U.S. PATENT DOCUMENTS

| 5,146,452 | A |   | 9/1992  | Pekarske        |         |
|-----------|---|---|---------|-----------------|---------|
| 5,764,624 | A |   | 6/1998  | Endo et al.     |         |
| 5,768,256 | A |   | 6/1998  | Allen et al.    |         |
| 5,905,714 | A | * | 5/1999  | Havansi ........ | 370/242 |
| 5,999,286 | A |   | 12/1999 | Venkatesan      |         |
| 6,092,113 | A | * | 7/2000  | Maeshima et al. | 370/355 |
| 6,118,785 | A | * | 9/2000  | Araujo et al.   | 370/401 |
| 6,167,025 | A |   | 12/2000 | Hsing et al.    |         |
| 6,185,210 | B1| * | 2/2001  | Troxel ........  | 370/395.32 |
| 6,324,162 | B1|   | 11/2001 | Chaudhuri       |         |
| 6,442,131 | B1|   | 8/2002  | Kondo           |         |
| 6,452,915 | B1| * | 9/2002  | Jorgensen ....... | 370/328 |
| 6,751,190 | B1|   | 6/2004  | Swallow         |         |

OTHER PUBLICATIONS

Awduche, D., et al., "Extension to RSVP for Traffic Engineering", Internet Draft, published at WWW.ietf.org/internet-drafts/draft-swallow-mpls-rsvp-trafeng-00.txt; Aug. 1998.
Awduche, D., et al., "Extension to RSVP for LSP Tunnels", Internet Draft, published at WWW.ietf.org/internet-drafts/draft-ietf-mpls-rsvp-lsp-tunnel-02.txt; Mar. 1999.
Rekhter, Y., Electronic mail message, "Session Object"; May 18, 1998.

(Continued)

*Primary Examiner*—Chi Pham
*Assistant Examiner*—Ronald Abelson
(74) *Attorney, Agent, or Firm*—Hamilton, Brook, Smith & Reynolds, P.C.

(57) ABSTRACT

In a tunnel connecting a source node to a destination node, data transfer for the tunnel is enabled through a first path. The data transfer is enabled by reserving resources in intermediate nodes in the first path between the source node and the destination node. Data transfer for the tunnel may be switched from the first path to a second path by reserving resources in intermediate nodes in the second path. If an intermediate node in the second path is shared by the second path and the first path, the resources reserved by the first path are shared by the second path. If an intermediate node in the second path is not shared by the first path, resources are reserved by the second path. After resources are reserved in the second path and data transfer is enabled in the second path, data transfer for the tunnel is switched to the second path.

17 Claims, 10 Drawing Sheets

OTHER PUBLICATIONS

Braden, R., et al., "Resource ReSerVation Protocol (RSVP)", Internet Draft, published at WWW.ietf.org/rfc/rfc2205.txt; Sep. 1997.

Callon, R. et al., "A Framework for Multiprotocol Label Switching," Internet Draft published at www.ietf.org/proceedings/98aug/I-D/draft-ietf-mpls-framework-02txt; May 1998.

* cited by examiner

408

| LENGTH | CLASS-NUM | C-TYPE |
|---|---|---|
| TYPE LENGTH | IPv4 ADDRESS | 610 |
| IPv4 ADDRESS | MASK | PADDR |
| TYPE LENGTH | IPv4 ADDRESS | 612 |
| IPv4 ADDRESS | MASK | PADDR |
| TYPE LENGTH | IPv4 ADDRESS | 614 |
| IPv4 ADDRESS | MASK | PADDR |

EXPLICIT ROUTE OBJECT

| LENGTH | CLASS-NUM | C-TYPE |
|---|---|---|
| FLAGS | OPTION VECTOR | 612 |

STYLE OBJECT

FIG. 6E

TUNNEL REROUTE

BACKGROUND OF THE INVENTION

There is a growing need for realtime data transfer on the Internet to support realtime applications such as, teleconferencing and live video. However, the Internet is not designed for realtime data transfer. Data is transferred on the Internet using Transmission Control Protocol ("TCP")/Internet Protocol ("IP"). TCP/IP includes four layers, the application layer, the transport layer, the network layer and the link layer.

Data originates in the application layer, for example, the application data may be frames of a live video to be transmitted from a source node to a destination node. The transport layer includes the TCP protocol. The TCP protocol in the source node processes the frames of the live video into TCP data packets and assigns a sequence number to each packet of data. The TCP protocol in the destination node reassembles the TCP data packets transmitted by the source node using the data packet's sequence numbers.

The network layer includes the IP protocol. The IP protocol adds an IP address for the destination node to each TCP data packet. The size of the IP address added is dependent on the version of the IP protocol used. Version 4 of the IP protocol ("IPv4") adds a 32 bit IP address to each TCP data packet. Version 6 of the IP protocol ("IPv6"), adds a 128 bit IP address to each TCP data packet. The Link layer in the source node sends the TCP data packets including IP addresses over the physical medium. The Link layer in the destination node receives the TCP data packets sent by the source node over the physical medium.

By dividing the application data into TCP data packets and providing the IP address for the destination node on each TCP data packet, each TCP data packet may travel on a different path between the source node and the destination node. Due to congestion in nodes along paths from the source node to the destination node, TCP data packets sent on different paths may not arrive in order.

For real-time data, for example, a live video the application can not wait until all the data packets are reassembled because the data packets are used as soon as they arrive at the destination node. If a data packet does not arrive at the destination node in time this delayed packet may be noticeable, for example, a delay in a data packet for live video may result in a loss of one or more frames of the video.

Extensions to TCP/IP have been proposed by the Internet Engineering Task Force ("IETF") to add support for realtime data transfer. One proposed extension to provide in-order delivery of data packets for realtime data transfer between a source node and a destination node is Multiprotocol Label Switching (MPLS) described in "A Framework for Multiprotocol Label Switching" by Callon et al. in a Network Working Group Internet Draft published at http://www.ietf.org/internet-drafts/draft-ietf-mpls-framework-02.txt on May 21, 1998 incorporated herein by reference. MPLS adds a label to a data packet to guide the data packets through nodes along a pre-defined path in a network. The pre-defined path is called a Label Switched Path ("LSP") Tunnel. LSP tunnels may be established using the Resource ReSerVation Protocol ("RSVP") described in "Resource ReSerVation Protocol (RSVP) Version 1 Functional Specification" by Branden et al. RSVP, Network Work Group, Request for Comment, 2205 published at http://www.ietf.org/rfc/rfc2205.txt on September 1997 incorporated herein by reference.

A "tunnel" in general, therefore, as used herein refers to a pre-defined path through networks. The "tunnel" may be established by RSVP or any other protocol now or hereafter established to support real time data transfer.

RSVP allows an application to reserve resources such as, bandwidth to transfer all TCP data packets originating in a specified application along a specified path between a source node and a destination node.

A disruption in service may occur in the tunnel, for example, due to a hardware failure in one or more nodes, or a connection between nodes, requiring the tunnel to switch data transfer to a new path between the source node and the destination node. Before the data transfer can commence on the new path resources must be reserved along the new path. The tunnel may also switch data transfer back to the old path, requiring resources to be reserved along the old path for example, after the hardware failure is repaired if the old path is better than the new path.

The tunnel's new path and the tunnel's old path may share intermediate nodes between the source node and the destination node. If the new path requests a resource reservation in a shared intermediate node before the old path has released the resource in the shared node, the resource is not available for the new path. If the old path releases the resource in the shared node the resource may be reserved by another path before the new path requests, the resource is not available for the new path. While the nodes in the new path are waiting for resources, data packets for the realtime application such as, live video are not being transmitted to the destination node.

SUMMARY OF THE INVENTION

The present invention relates to efficiently switching data transfer from a first reserved communications path to a second reserved communications path. The second communications path is enabled before the first communications path is disabled.

The second communications path is enabled by reserving resources in the second path not shared with the first path. The shared resources are determined by comparing path identification and tunnel session identification fields in a path message. The path message and a reserve message are forwarded to all the nodes in the second path to reserve the resources.

The first communications path is disabled by releasing resources not shared by the first communication path and the second communication path. The resources are released by forwarding a release message to all the nodes in the first path.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 6A–6E show the format of the objects shown in the Reservation Message in FIG. 5, the Path Message shown in FIG. 4 and the PathTear Message shown in FIG. 9;

DETAILED DESCRIPTION OF THE INVENTION

Figure 1:
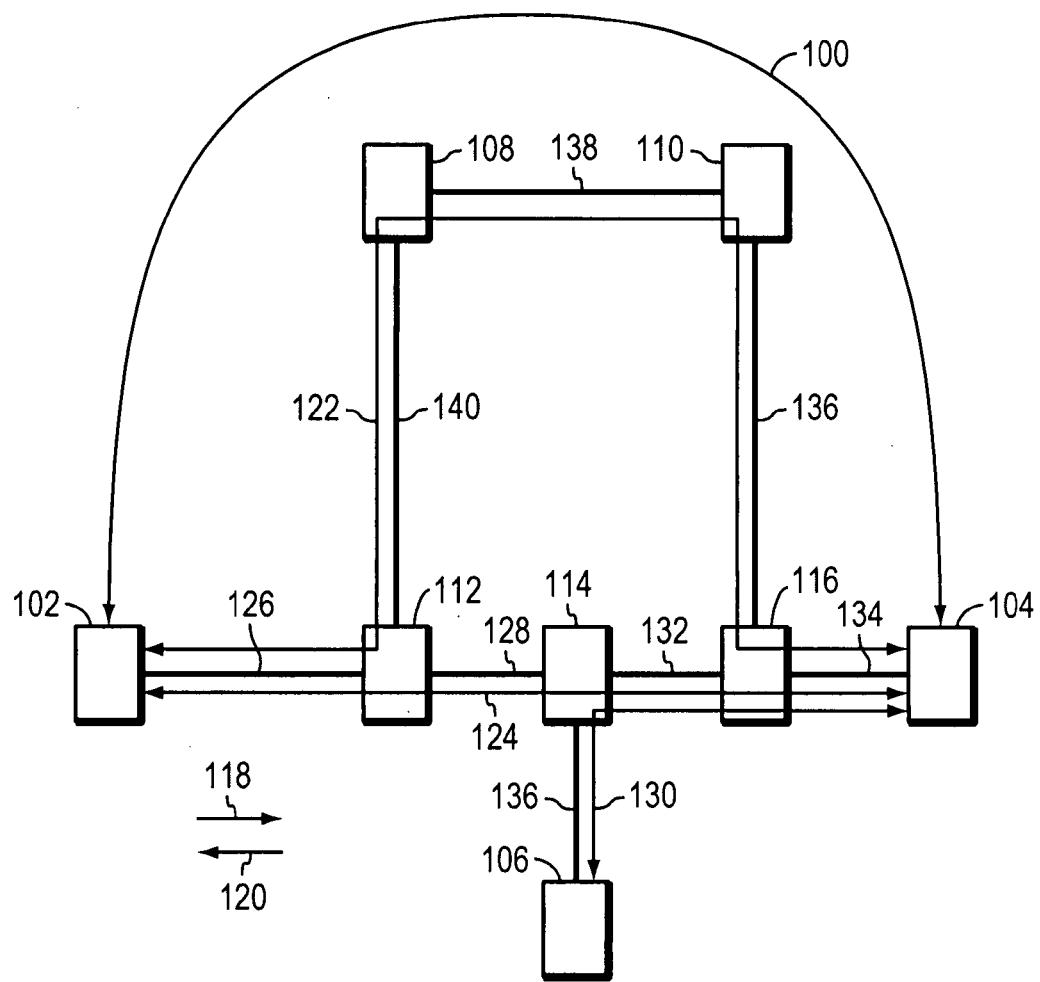
FIG. 1 shows a tunnel connecting a source node to a destination node, the tunnel includes a first path and a second path, data transfer for the tunnel may be switched from the first path to the second path according to the principles of the present invention.

FIG. 1 shows a tunnel 100 connecting a first source node 102 and a destination node 104. Tunnel 100 includes a first path 124 and a second path 122. Data transfer for tunnel 100 may be enabled through the first path 124 or the second path 122. Tunnel 100 includes nodes 102, 104, 112, 114, 116, 108 and 110 connected by bi-directional communications links 126, 128, 132, 134, 140, 138 and 136. The nodes 102, 104, 112, 114, 116, 108 and 110 may be host computers or routers. Data packets are transferred between nodes 102, 104, 112, 114, 116, 118 and 110 on communication links 126, 128, 132, 134, 140, 138 and 136 using a network protocol such as, TCP/IP.

For example, if data transfer for tunnel 100 is enabled through the first path 124, data packets from the first source node 102 are transmitted on communications link 126 to intermediate node 112, from intermediate node 112 on communications link 128 to intermediate node 114, from intermediate node 114 on communications link 132 to intermediate node 116, and from intermediate node 116 on communications link 134 to destination node 104. If data transfer for tunnel 100 is enabled through the second path 122, data packets from the first source node 102 are transmitted on communications link 126 to intermediate node 112, from intermediate node 112 on communications link 140 to intermediate node 108, from intermediate node 108 on communications link 138 to intermediate node 110, from intermediate node 110 on communications link 136 to intermediate node 130, and from intermediate node 130 on communications link 134 to destination node 104.

There is a third path 130 shown between the second source node 106 and the destination node 104. The third path 130 is not associated with tunnel 100. The third path transmits data packets from the second source node 106 on communications link 136 to intermediate node 114, from intermediate node 114 on communications link 132 to intermediate node 116, and from intermediate node 116 on communications link 134 to intermediate node 104. The third path 130 may be established as another tunnel from the second source node 106 to the destination node 104.

It can be seen that some of the intermediate nodes 112, 114, 116, 108 and 110 are shared by multiple paths, for example, intermediate node 114 is shared by the first path 124 and the third path 130, intermediate node 112 is shared by the first path 124 and the second path 120 and intermediate node 116 is shared by the first path 124, the second path 122 and the third path 130. Paths sharing nodes compete for resources such as, bandwidth in the shared link. For example, the first path 124, the third path 130 and the second path 122 compete for resources in link 132.

The present invention is described using RSVP and MPLS to establish tunnel 100 and IP to transfer data packets in tunnel 100. Each of the nodes 102, 104, 112, 114, 116, 108, 110 also includes support for RSVP and MPLS. This embodiment of the present invention is described for nodes implementing IPv4, in other embodiments nodes may implement IPv6.

The tunnel 100 between the first source node 102 and the destination node 104 includes the first path 124 and the second path 122. The first path 124 is enabled for data transfer for the tunnel 100 through RSVP. RSVP reserves resources for links 126, 128, 132, and 134 and enables nodes 112, 114 and 116 to transfer data packets for the tunnel 100.

RSVP sends and receives control messages only. RSVP does not send or receive data packets. RSVP control messages, to reserve resources, are transmitted between the source nodes 102, 106 and the destination node 104 in direction 118. RSVP control messages are transmitted from the destination node 104 to the first source node 102 and the second source node 106 in direction 120 to inform the first source node 102 that the requested resources for the path have been reserved.

Figure 2:
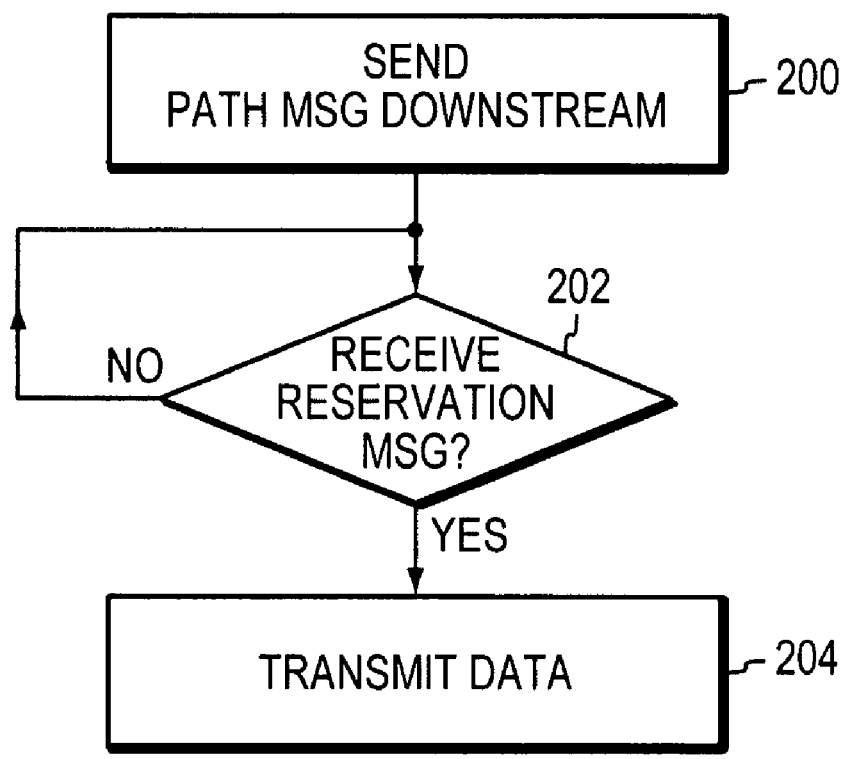
FIG. 2 is a flow diagram of a method implemented in any of the source nodes shown in FIG. 1 for reserving resources for any of the tunnel's paths.
Figure 3:
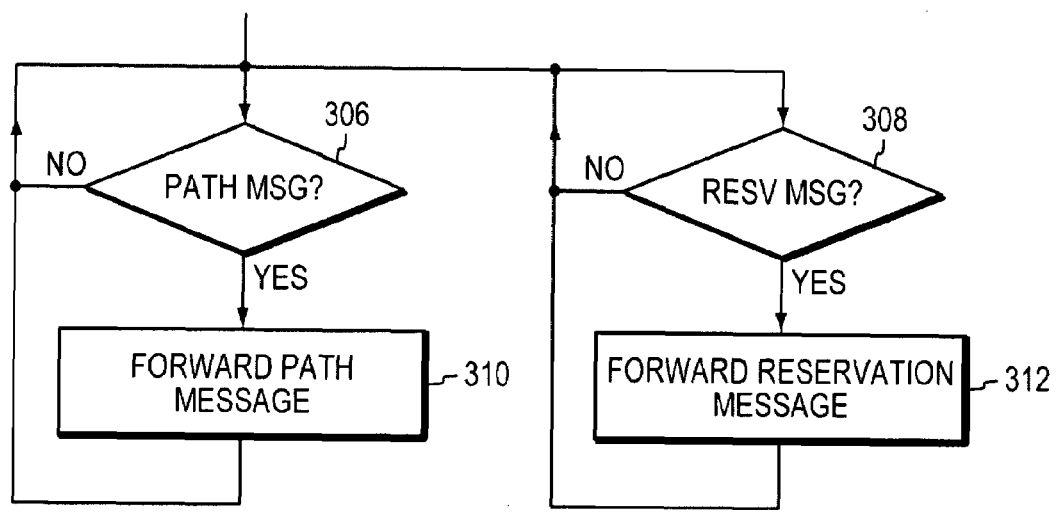
FIG. 3 is a flow diagram of a method implemented in any of the intermediate nodes shown in FIG. 1 for reserving resources for any of the tunnel's paths.

FIGS. 2 and 3 in conjunction with FIG. 1, FIG. 4, FIG. 5 and FIGS. 6A–6E describe how RSVP reserves resources and enables the transfer of specified application data in the tunnel's first path 124 between the first source node 102 and the destination node 104. FIG. 2 shows how the first source node 102 (FIG. 1) establishes a tunnel 100 to connect the first source node 102 (FIG. 1) to the destination node 104 (FIG. 1). FIG. 2 also shows how the first source node 102 (FIG. 1) enables the first path 124 to transfer the specified application data for the tunnel 100. FIG. 3 shows how the intermediate node 112 (FIG. 1) processes RSVP control messages sent from the first source node 102 (FIG. 1) and the destination node 104 (FIG. 1). RSVP control messages for establishing a reserved path for the tunnel 100 between the first source node 102 (FIG. 1) and the destination node 104 (FIG. 1) include the Path Message 400 shown in FIG. 4 and the Reservation Message 500 shown in FIG. 5.

Referring to FIG. 2, in step 200, the first source node 102 (FIG. 1) sends a Path Message 400 (FIG. 4) downstream in direction 118 (FIG. 1) towards the destination node 104 (FIG. 1).

Figure 4:
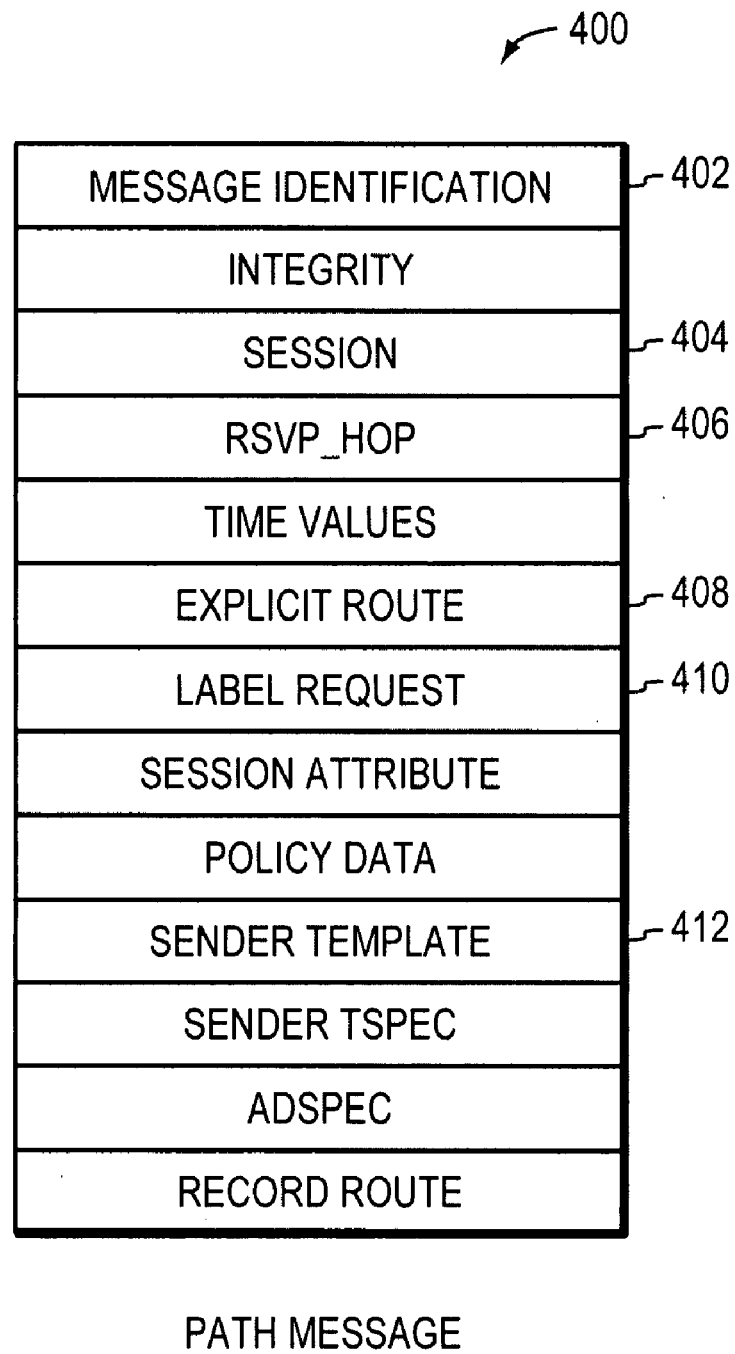
FIG. 4 shows the format of the Path Message sent from the source node to the destination node to reserve resources along any one of the tunnel's paths shown in FIG. 1.

FIG. 4 shows the format of the Path Message 400 sent by the first source node 102 (FIG. 1). The Message Identification Object 402 identifies the message type as a Path Message 400. The Session Object 404 identifies the session. The format of the Session Object 404 is shown in FIG. 6A.

Figure 6A:
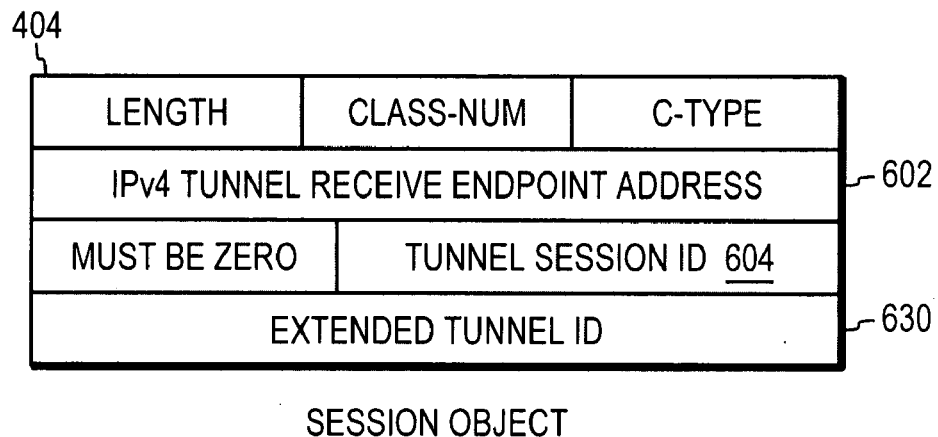

Referring to FIG. 6A, to establish the tunnel 100 between the first source node 102 (FIG. 1) and the destination node 104 (FIG. 1), the Session Object 404 provides the IPv4 Endpoint Address 602 providing the address of the tunnel's destination node 104 (FIG. 1) in IPv4 format, a Tunnel Session Identification 604 providing a value indicating tunnel 100 (FIG. 1) and an Extended Tunnel Identification 630 providing the IPv4 Source Address for the first source node 102 (FIG. 1).

Continuing with FIG. 4, the RSVP_HOP Object 408 includes the address of the first source node 102 (FIG. 1) in IPv4 format. The Explicit Route Object 412 includes a list of the IPv4 addresses for the intermediate nodes 112, 114, 116 in the first path 124. The format of the Explicit Route Object 412 is shown in FIG. 6D.

Referring to FIG. 6D, to set up an explicit route between the first source node 102 (FIG. 1) and the destination node 104 (FIG. 1) the IPv4 address for intermediate node 112 (FIG. 1) is stored in IPv4 address 610, the IPv4 address for intermediate node 114 (FIG. 1) is stored in IPv4 address 612, and the IPv4 address for intermediate node 116 (FIG. 1) is stored in IPv4 address 614.

Continuing with FIG. 4, the Label Request Object 414 includes the data packet types to be transferred through the tunnel 100. The Sender Template Object 420 includes the IPv4 address of the first source node 102 (FIG. 1). The format of the Sender Template Object 420 is shown in FIG. 6B.

Figure 6B:
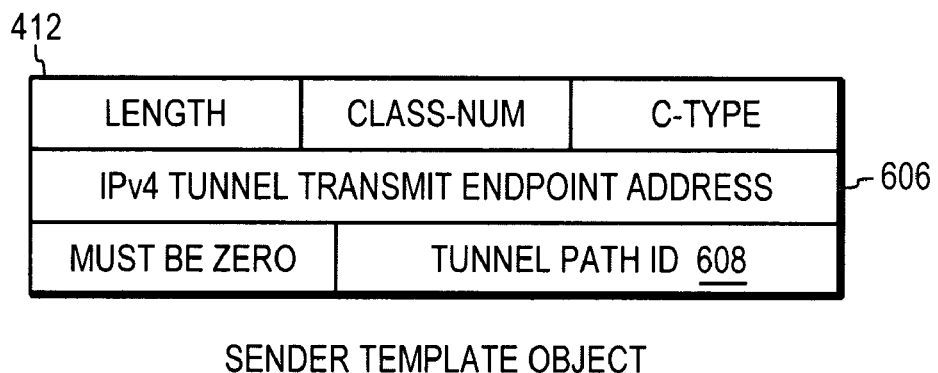

Referring to FIG. 6B, the IPv4 address of the first source node 102 (FIG. 1) is stored in IPv4 Tunnel Sender Address 606 and a tunnel path identification value indicating the first path 124 (FIG. 1) is stored in Tunnel Path Identification 608.

FIG. 3 shows a flow diagram of a method implemented in any of the intermediate nodes shown in FIG. 1 for reserving resources for any of the tunnel's paths. In step 306, if one of the intermediate nodes 112 (FIG. 1), 114 (FIG. 1) or 116 (FIG. 1) on the second path 122 (FIG. 1) receives a Path Message 400, the Path Message 400 is forwarded in step 310 to the adjacent node in direction 118, if the resources are available for the intermediate node to set up the first path 124 for the tunnel 100.

For example, if intermediate node 112 (FIG. 1) receives a Path Message 400 from first source node 102 (FIG. 1) in step 306 (FIG. 3), intermediate node 112 (FIG. 1) forwards the Path Message 400 to intermediate node 114 (FIG. 1) in step 310. Before forwarding the Path Message 400 to intermediate node 114 (FIG. 1), intermediate node 112 (FIG. 1) modifies the Path Message 400. The Path Message 400 is modified by changing the RSVP_HOP Object 406 to the address of intermediate node 112 (FIG. 1) in IPv4 format.

Returning to FIG. 2, in step 202, the first source node 102 (FIG. 1) waits for a Reservation Message 500 (FIG. 5) to be sent back from the destination node 104 (FIG. 1) indicating that the reservation is complete.

Figure 5:
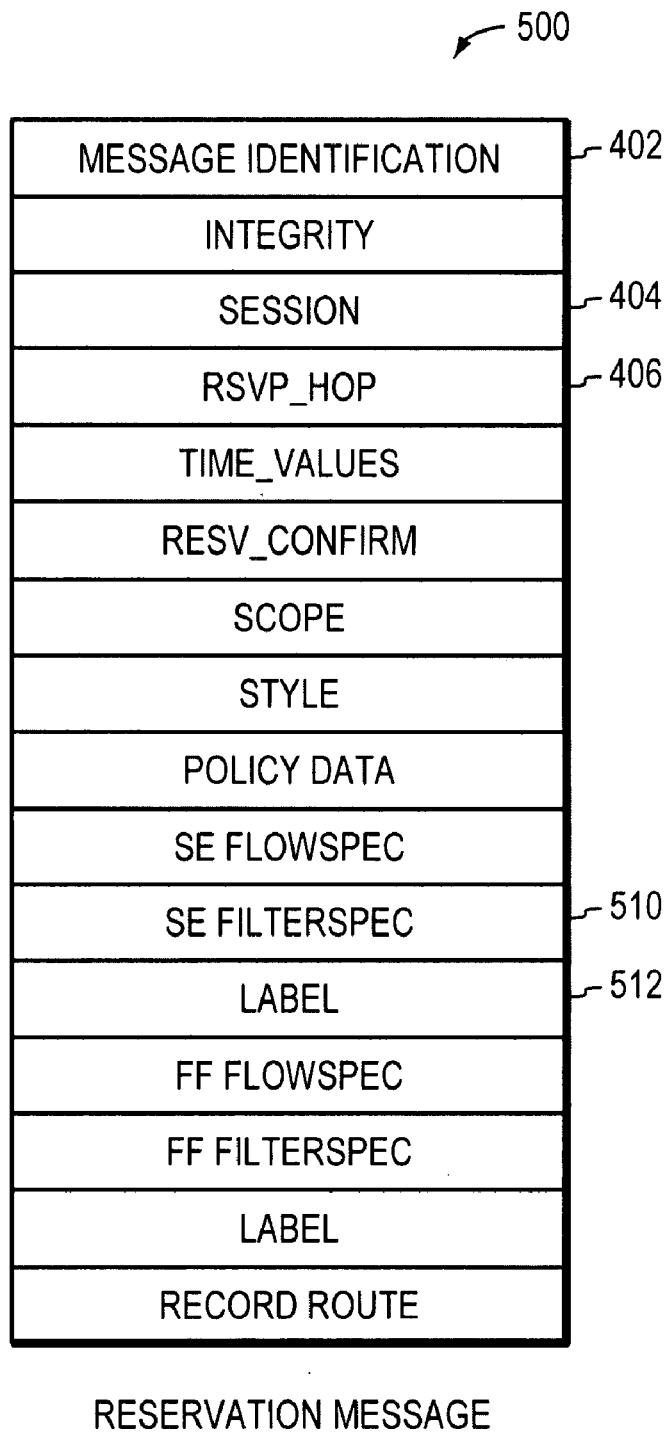
FIG. 5 shows the format of the Reservation Message sent from the destination node to the source node to reserve resources along any of the tunnel's paths shown in FIG. 1.

FIG. 5 shows the format of the Reservation Message 500. The Message Identification 402 identifies the message type as a Reservation Message. The Session Object 404 identifies the session.

Returning to FIG. 6A, to establish the tunnel 100 between the first source node 102 (FIG. 1) and the destination node 104 (FIG. 1), the Session Object 404 provides the IPv4 Endpoint Address 602 providing the address of the tunnel's destination node 104 (FIG. 1) in IPv4 format, a Tunnel Session Identification 604 providing a value indicating tunnel 100 (FIG. 1) and an Extended Tunnel Identification 630 providing the IPv4 Source Address for the first source node 102 (FIG. 1).

Continuing with FIG. 5, the RSVP_HOP Object 408 includes the address of intermediate node 112 (FIG. 1) in IPv4 format. The Style Object 506 specifies the type of resource reservation provided for the tunnel 100 on the first path 124. The format of the Style Object 506 is shown in FIG. 6E.

Referring to FIG. 6E, the Option Vector 612 in the Style Object 506 may be set to a value indicating that the resources may be shared with another path.

Returning to FIG. 5, the Shared Explicit Flowspec Object 508 specifies the data packet types for which resources have been reserved. For the standard RSVP Shared Explicit Style, the Shared Explicit Filter Spec Object 510 specifies the data packet types for which resources have been reserved and is used to identify the tunnel path. When used with MPLS, the Label Object 512 is used to identify those data packet types. The format of the Shared Explicit Filter Spec Object 510 is shown in FIG. 6C.

Figure 6C:
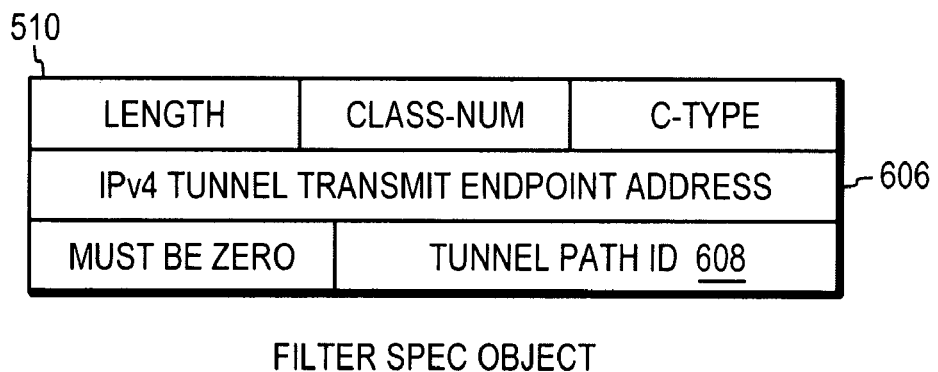

Referring to FIG. 6C, the Shared Explicit Filter Spec Object 510 includes the IPv4 address of the first source node 102 (FIG. 1) stored in IPv4 Tunnel Sender Address 606 and the value of the tunnel path identification, for example, '1' assigned to the first path 124 (FIG. 1) in tunnel path ID 608.

Continuing with FIG. 5, the Label Object 512 provides a stack of labels assigned to the reserved resources.

Returning to FIG. 3, in step 308 in FIG. 3 if one of the intermediate nodes 112 (FIG. 1), 114 (FIG. 1) or 116 (FIG. 1) on the second path 122 (FIG. 1) receives a Reservation Message 500, the Reservation Message 500 is forwarded in step 312 to the adjacent node in direction 120. For example, if intermediate node 112 (FIG. 1) receives a Reservation Message 500 from intermediate node 114 (FIG. 1) in step 308, intermediate node 112 forwards the Reservation Message 500 to first source node 102 (FIG. 1) in step 312. Before forwarding the Reservation Message 500 the intermediate node 112 (FIG. 1) modifies the Reservation Message 500. The Reservation Message 500 is modified by changing the RSVP_HOP Object 406 to the address of intermediate node 112 (FIG. 1) in IPv4 format.

Returning to FIG. 2 in step 204 after the first source node 102 (FIG. 1) has received the Reservation Message 500 (FIG. 5) sent from the destination node 104 (FIG. 1) in direction 120, the tunnel 100 between the first source node 102 (FIG. 1) and the destination node 104 (FIG. 1) is available and the first source node 102 (FIG. 1) may transmit the data packets for the specified application to the destination node 104 (FIG. 1) using the reserved resources the first path 124 (FIG. 1).

Returning to FIG. 1, after the tunnel 100 has been established between the first source node 102 and the destination node 104 and data transfer is enabled on the first path 124, data transfer may be switched from the first path 124 to the second path 122.

Figure 7:
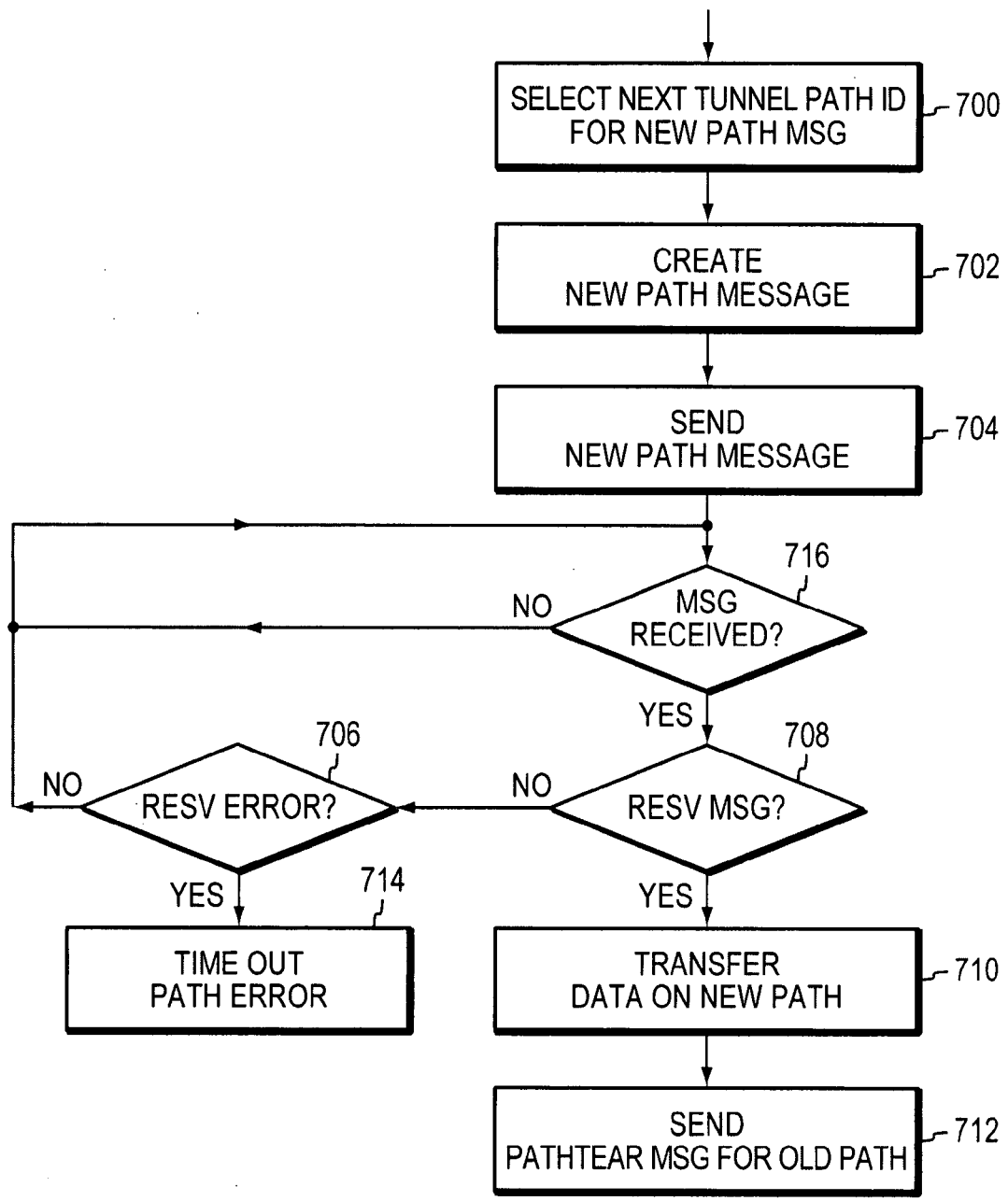
FIG. 7 is a flow diagram of a method implemented in any of the source nodes shown in FIG. 1 for reserving resources in the tunnel's second path shown in FIG. 1 and releasing resources reserved for the tunnel's first path in FIG. 1.

FIG. 7 is a flow diagram of a method implemented in a path switch routine in the first source node 102 (FIG. 1) for reserving resources in the tunnel's second path 122 (FIG.) and releasing resources reserved for the tunnel's first path 124 (FIG. 1). The path switch routine includes an enable routine and a disable routine.

In step 700 in the enable routine an available tunnel path identification is selected for the second path 122 (FIG. 1). For example, if the first path 124 (FIG. 1) is assigned a tunnel path identification of '1', the next path identification to be assigned to the second path 122 (FIG. 1) is '2'.

In step 702 in the enable routine a new Path Message 400 (FIG. 4) is created for the second path 122 (FIG. 1). The values of objects in the Path Message 400 (FIG. 4) for the first path 124 differ from the values of the objects in the new Path Message 400 (FIG. 4) for the second path 122.

Returning to FIG. 6B, the Tunnel Path Identification 608 in the Sender template Object 412 in the Path Message 400 is set to value indicating first path, for example, '1' for the first path 124 and set to a value indicating second path, for example, '2' for the second path 122.

Returning to FIG. 6D, the IPv4 addresses 610, 612, 614 in the Explicit Route Object 408 in the Path Message 400 are set to the IPv4 addresses of intermediate nodes 112, 114, and 116 respectively for the first path 124. The IPv4 addresses 610, 612, 614 are set to the IPv4 addresses of intermediate nodes 112, 108 and 110 respectively for the second path 122.

Continuing with FIG. 7, in step 704 in the enable routine the new Path Message 400 for the second path 122 is sent to intermediate node 112.

Figure 8:
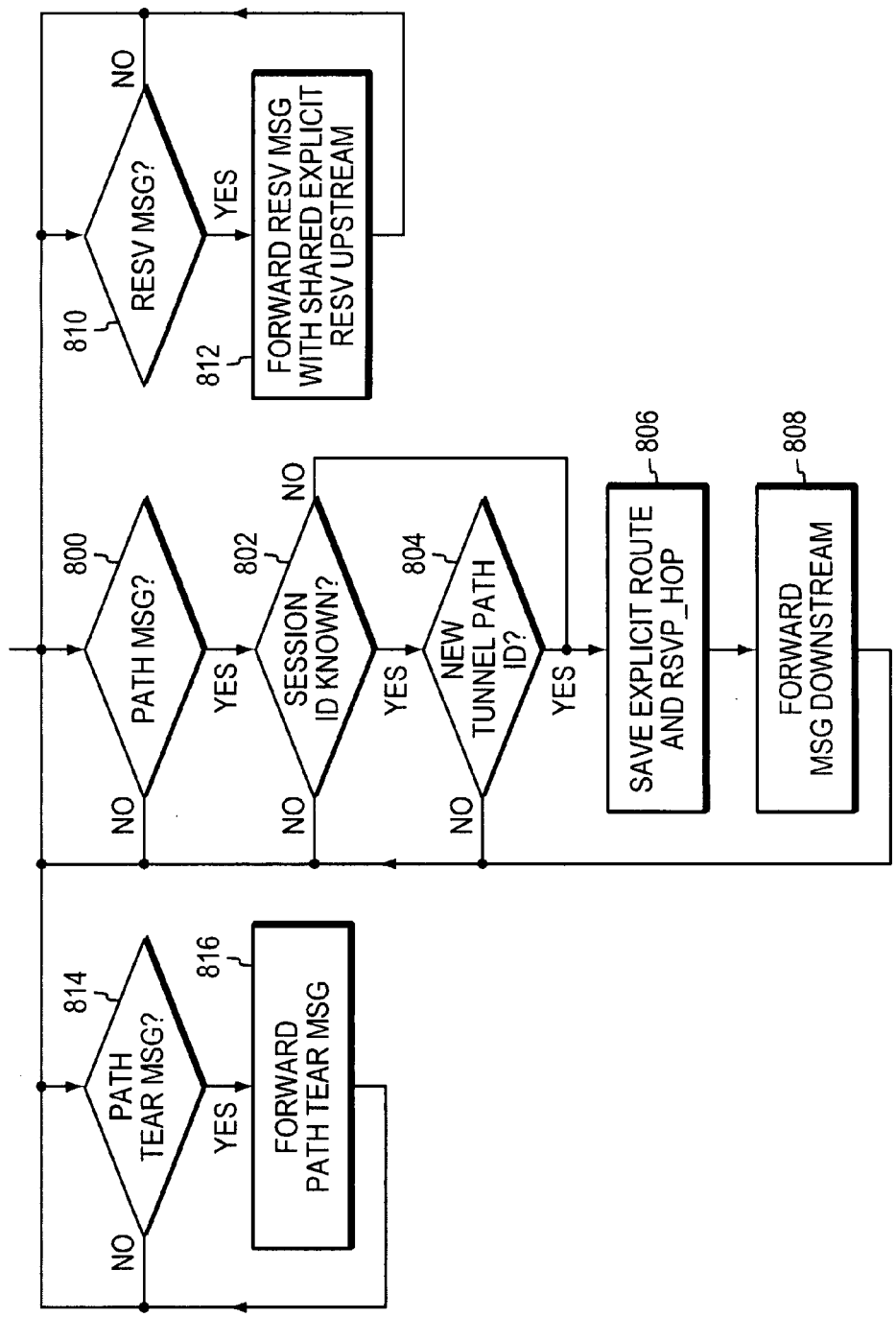
FIG. 8 is a flow diagram of a method implemented in any of the intermediate nodes shown in FIG. 1 for reserving resources for the tunnel's second path shown in FIG. 1 and releasing resources reserved for the tunnel's first path shown in FIG. 1.

FIG. 8 shows the steps carried out in the intermediate nodes along the second path 122 to set up the second path 122 to transfer data for the tunnel 100. The steps may be implemented in a path switch routine. The path switch routine includes steps for processing Path Messages 400 and Reservation Messages 500, steps for processing PathTear Messages 900.

In step 800 one of the intermediate nodes 112, 108, 110, 116 in the second path 122 receives a Path Message 400 from the adjacent previous node in the second path 122.

In step 802 the intermediate node 112, 108, 110, 116 determines in a session-tunnel routine if the tunnel 100 is known, by looking at the value of the Tunnel Session Identification 604 in the Session Object 404 in the Path Message 400.

Intermediate nodes 108 and 110 are not in the first path 124, thus tunnel 100 is unknown. In step 806 the Explicit Route Object 412 and RSVP_HOP Object 408 in the new Path Message 400 are saved. In step 808, intermediate node 108 forwards the Path Message 400 to intermediate node 110. Intermediate node 110 forwards the Path Message 400 to intermediate node 116.

Intermediate nodes 112 and 116 are in the second path 122, thus tunnel 100 is known because intermediate nodes 112 and 116 are shared by the first path 124 and the second path 122. In step 804 intermediate nodes 112 and 116 determine in the session-tunnel routine if this is a new path from the tunnel path identification 608 (FIG. 6B) in the Sender Template Object 412 in the Path Message 400. In step 806 the Explicit Route Object 412 and RSVP_HOP Object 408 in the new Path Message 400 are saved. In step 808 intermediate node 112 forwards the Path Message 400 to intermediate node 108. Intermediate node 116 forwards the Path Message 400 to destination node 104.

The new Path Message 400 is forwarded to the destination node 104 along the second path 122 in direction 118 through intermediate nodes 112, 108, 110 and 116. The destination node 104 determines that the Path Message 400 is requesting a new path for an existing tunnel by looking at the value of the Tunnel Session Identification 608 (FIG. 6B) in the Session Object 404 and the Tunnel Path Identification 608 in the Sender Template Object 402 in the Path Message 400.

After receiving the Path Message 400 from the first source node 102, the destination node 104 creates a Reservation Message 500 to be forwarded along the second path 122 in direction 120 through intermediate nodes 112, 108, 110 and 116. The destination node 104 sets the value of the Tunnel Path Identification 608 (FIG. 6C) in the Filter Spec Object 510 in the Reservation Message 500 to the same value as the Tunnel Path Identification 608 in the Sender Template Object 608 (FIG. 6B) in the Path Message 400.

The destination node 104 also sets the Option Vector 612 in the Style Object 506 in the Reservation Message 500 to a value indicating that the resources for the second path 122 are shared with the first path 124.

Continuing with FIG. 8 the Reservation Message 500 from the destination node 104 is forwarded through intermediate nodes 116, 110, 108, 112 in direction 120 to the first source node 102.

In step 810 any of the intermediate nodes 116, 110, 108 and 112 receiving the Reservation Message 500 from the previous adjacent node determine if the requested resources may be reserved for the second path 122.

In intermediate node 116 and first source node 102 the requested resources for the second path 122 have already been reserved for the first path 124. The intermediate node 116 and the first source node 102 determine that the requested resources are for the same tunnel by watching the Session Object 404 in the Reservation Message 500. The intermediate node 116 and the first source node 102 determine that the requested resources are to be explicitly shared by looking at the Option Vector 612 (FIG. 6E) in the Style Object 506 in the Reservation Message 500. Intermediate node 116 and first source node 102 allow the second path 122 to share the resources reserved for the first path 124 and therefore allows the second path 122 to be enabled for the same tunnel.

In intermediate nodes 108 and 110 the requested resources have not been previously reserved for the tunnel 100. In step 812 intermediate nodes 108 and 110 reserve the requested resources for the second path 122. Intermediate node 110 forwards the Reservation Message 500 with Option Vector 612 in the Style Object 506 set to shared explicit to intermediate node 108. Intermediate node 108 forwards the Reservation Message 500 with Option Vector 612 in the Style Object 506 set to shared explicit to intermediate node 112.

Returning to FIG. 7, in step 716 the first source node 102 waits for a Reservation Message 500 to be received from the destination node 104. In step 706 if the destination node 104 or any of the intermediate nodes 112, 108, 110, 116 in the second path 122 can not provide the resources requested by the first source node 102 in the Path Message 400, a Path error Message (not shown) is returned to the first source node 102. In step 714 the first source node 102 generates a time out Path Error.

In step 708 if the first source node 102 receives a Reservation Message 500 to be forwarded from the destination on node 104 through intermediate node 112 in direction 120, in step 710 the first source node 102 may start transmitting data to the destination node 104 through the second path 122.

In step 712 in the disable routine after the second path 122 is enabled, the first source node 102 sends a PathTear Message 900 to the destination node 104 for the first path 124. The PathTear Message 900 is sent to release the reservation of resources made for the first path 124 in the destination node 104 and intermediate nodes 112, 118, 110, 116.

Figure 9:
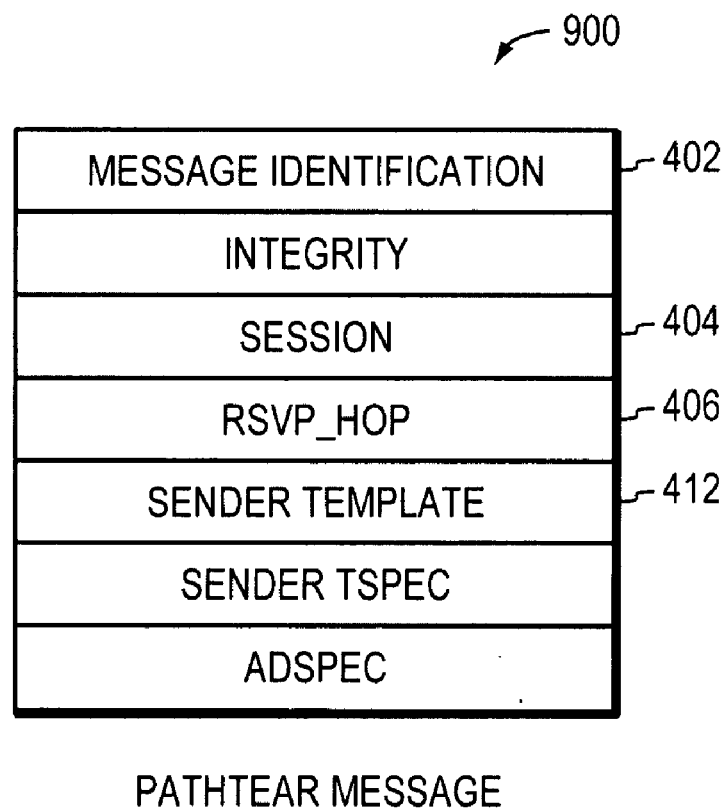
FIG. 9 shows the format of the PathTear Message sent from the source node to the destination node to release resources along any of the tunnel's paths shown in FIG. 1.

FIG. 9 shows the format of the PathTear Message 900. It includes a message identification Object 402 with the message type set to PathTear Message. It also includes a Session Object 404 (FIG. 6A) and the tunnel identification set to a value indicating the tunnel 100, an RSVP_HOP Object 406 and a Sender Template object 412 (FIG. 6B) with tunnel identification set to a value indicating the tunnel 100. The PathTear Message 900 is sent to remove resource reservations made for the first path 124 in intermediate nodes 112, 114 and 116.

Returning to FIG. 8, in step 814, any of the intermediate nodes in the first path 124 receives a PathTear Message 900. For example, intermediate node 114 receiving a PathTear Message 900 determines in a release resources routine that the resources reserved for the first path 124 are to be released because intermediate node 114 is not shared with the second path 122. Intermediate node 114 determines that the resources may be released by looking at the Tunnel Session Identification 604 (FIG. 6A) in the Session Object 404 and the Tunnel Path Identification 608 (FIG. 6C) in the Filter Spec Object 510 in the PathTear Message 900.

Intermediate nodes 112, 116 determine in a release resources routine that the resources reserved for the first path 124 are not to be released because intermediate nodes 112, 116 are shared with the second path 122. Intermediate nodes 112, 116 determine that the resources may not be released by looking at the Tunnel Session Identification 604 (FIG. 6A) in the Session Object 404 and the Tunnel Path Identification 608 (FIG. 6C) in the Filter Spec Object 510 in the PathTear Message 900.

In step 816, the PathTear Message 900 is forwarded by the intermediate node to the adjacent node in the first path 124.

It will be apparent to those of ordinary skill in the art that methods involved in the present invention may be embodied in a computer program product that includes a computer usable medium. For example, such a computer usable medium can consist of a read only memory device, such as a hard drive device or a computer diskette, having computer readable program code stored thereon.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for switching from a reserved first path between a source node and a destination node, the reserved first path comprising one or more interconnected nodes, to a reserved second path comprising one or more interconnected nodes comprising the steps of:
    enabling the second path for data transfer between the source node and destination node; and
    disabling the first path for data transfer between the source node and the destination node after enabling the second path for data transfer;
    wherein the step of enabling further comprises:
        determining the nodes and links shared by the second path and the first path; and
        reserving resources in the second path not shared with the first path;
    wherein the step of determining further comprises:
        comparing a path identification field value and a tunnel session identification field value in a path message for the second path with the path identification field value and the tunnel session identification field value in the reserve message for the first path.

2. A method as claimed in claim 1 wherein the step of reserving further comprises:
    sending a path message for the second path to the destination node; and
    sending a reserve message for the second path to the source node in response to the path message sent to the destination node.

3. A method as claimed in claim 1 wherein the step of disabling further comprises:
    releasing resources in the first path not shared with the second path.

4. A method as claimed in claim 3 wherein the step of releasing further comprises:
    sending a request release message for the first path by the source node to the destination node.

5. A method for switching from a reserved first path between a source node and a destination node, the reserved first path comprising one or more interconnected nodes, to a reserved second path comprising one or more interconnected nodes comprising the steps of:
    enabling the second path for data transfer between the source node and destination node; and
    disabling the first path for data transfer between the source node and the destination node after enabling the second path for data transfer wherein the step of enabling in an intermediate node comprises the steps of:
    receiving a path message from an upstream node;
    sharing resources with the first path dependent on a tunnel session and tunnel path identification in the path message; and
    forwarding the path message to a downstream node.

6. A method for switching from a reserved first path between a source node and a destination node, the reserved first path comprising one or more interconnected nodes, to a reserved second path comprising one or more interconnected nodes comprising the steps of:
    enabling the second path for data transfer between the source node and destination node; and
    disabling the first path for data transfer between the source node and the destination node after enabling the second path for data transfer wherein the step of disabling in an intermediate node comprises the steps of:
    receiving a path tear message from an upstream node;
    releasing resources for the first path dependent on a tunnel session identification and tunnel path identification in the path tear message; and
    forwarding the path tear message to a downstream node.

7. An apparatus for switching from a reserved first path between a source node and a destination node, the reserved first path comprising one or more interconnected nodes, to a reserved second path comprising one or more interconnected nodes comprising:
    a path switch routine;
    means, within the path switch routine, for enabling the second path for data transfer between the source node and the destination node; and
    means, within the path switch routine, for disabling the first path for data transfer between the source node and the destination node after the second path is enabled for data transfer;
    wherein the means for enabling further comprises:
    means for determining the nodes and links shared by the second path and the first path; and
    means for reserving resources in the second path not shared with the first path, and
    wherein the means for determining further comprises:
    means, within the path switch routine, for comparing a path identification field value and a tunnel session identification field value in a path message for the second path with the path identification field value and the tunnel session identification field value in the path message for the first path.

8. An apparatus as claimed in claim 7 wherein the means for reserving further comprises:
    means, within the path switch routine, for sending a path message for the second path by the source node to the destination node; and means, within the path switch routine, for sending a reserve message for the second path by the destination node to the source node after the destination node has received the path message.

9. An apparatus as claimed in claim 7 wherein the means for disabling further comprises:
means, within the path switch routine, for releasing resources in the first path not shared with the second path.

10. An apparatus as claimed in claim 9 wherein the means for releasing further comprises:
means, within the path switch routine, for sending a release message for the first path by the source node to the destination node.

11. An apparatus for switching from a reserved first path between a source node and a destination node, the reserved first path comprising one or more interconnected nodes, to a reserved second path comprising one or more interconnected nodes comprising:
a path switch routine responsive to a request for switching from the first path to the second path, the path switch routine further comprising:
an enable routine which enables the second path for data transfer between the source node and the destination node; and
a disable routine which disables the first path for data transfer between the source node and the destination node after the enable routine has enabled the second path for data transfer,
wherein the enable routine further comprises:
a shared node detection routine which determines the nodes and links shared by the second path and the first path; and
a reserve resources routine which reserves resources in the second path not shared with the first path,
wherein the shared node detection routine further comprises:
a compare routine which compares a path identification field value and a tunnel session identification field value in a path message for the second path with the path identification field value and the tunnel session identification field value in the path message for the first path.

12. An apparatus as claimed in claim 11 wherein the reserve resources routine further comprises:
a path message routine which sends a path message for the second path from the source node to the destination node; and
a reserve message routine which sends a reserve message for the second path from the destination node to the source node in response to the path message sent by the request path message routine.

13. An apparatus as claimed in claim 12 wherein the path message comprises:
a session identification identifying a tunnel; and
a tunnel path identification identifying a tunnel path for the tunnel.

14. An apparatus as claimed in claim 13 wherein the disabling routine further comprises:
a release resources routine which releases resources in the first path not shared with the second path.

15. An apparatus as claimed in claim 11 wherein the release resources routine further comprises:
a request release message routine which sends a release message for the first path to the destination node.

16. An apparatus for switching from a reserved first path between a source node and a destination node, the reserved first path comprising one or more interconnected nodes, to a reserved second path comprising one or more interconnected nodes comprising:
a path switch routine responsive to a request for switching from the first path to the second path, the path switch routine further comprising:
an enable routine which enables the second path for data transfer between the source node and the destination node; and
a disable routine which disables the first path for data transfer between the source node and the destination node after the enable routine has enabled the second path for data transfer wherein the enable routine in the intermediate node comprises:
a path message receive routine for receiving a path message from an upstream node;
a session-path routine for sharing resources with the first path dependent on a tunnel session and tunnel path identification in the path message; and
a path message forward routine for forwarding the path message to a downstream node.

17. An apparatus for switching from a reserved first path between a source node and a destination node, the reserved first path comprising one or more interconnected nodes, to a reserved second path comprising one or more interconnected nodes comprising:
a path switch routine responsive to a request for switching from the first path to the second path, the path switch routine further comprising:
an enable routine which enables the second path for data transfer between the source node and the destination node; and
a disable routine which disables the first path for data transfer between the source node and the destination node after the enable routine has enabled the second path for data transfer wherein the disable routine in an intermediate node comprises:
a receive path tear message routine for receiving a path tear message from an upstream node;
a release resources routine for releasing resources for the first path dependent on a tunnel session identification and tunnel path identification in the path tear message; and
a forward path tear message routine for forwarding the path tear message to a downstream node.

* * * * *